United States Patent [19]

Bauer

[11] 4,272,223
[45] Jun. 9, 1981

[54] FLUID DYNAMIC ENERGY EXCHANGER

[76] Inventor: Peter Bauer, 13921 Esworthy Rd., Germantown, Md. 20767

[21] Appl. No.: 25,714

[22] Filed: Mar. 30, 1979

[51] Int. Cl.³ .............................................. F04F 11/02
[52] U.S. Cl. ..................................... 417/54; 123/559; 417/65
[58] Field of Search ............... 123/119 C; 417/65, 64, 417/53, 54, 240; 60/39.45, 269, 279

[56] References Cited

U.S. PATENT DOCUMENTS

| 3,016,066 | 1/1962 | Warren | 137/836 |
|---|---|---|---|
| 3,046,732 | 7/1962 | Foa | 60/269 X |
| 3,165,061 | 1/1965 | Smith et al. | 417/240 X |
| 3,581,719 | 6/1971 | Gau | 60/279 X |

Primary Examiner—Carlton R. Croyle
Assistant Examiner—Edward Look
Attorney, Agent, or Firm—Ira C. Edell

[57] ABSTRACT

Transfer of energy from a relatively high pressure flowing first fluid to a relatively low pressure second fluid is achieved with a master commutator (10) driven solely in response to the flowing first fluid and which separates the first fluid into discrete slugs. Compression waves generated by the pressurized first fluid pressurizes the second fluid in a flow passage (11). The second fluid and first fluid are separately removed from the flow passage by a slave commutator (13) which is synchronized in frequency to the master commutator. In a preferred embodiment the master and slave commutators are fluidis oscillators (20, 21) having no moving parts. The technique has particular utilization as a supercharger for diesel engines.

11 Claims, 2 Drawing Figures

FLUID DYNAMIC ENERGY EXCHANGER

TECHNICAL FIELD

The present invention relates generally to an improved method and apparatus for exchanging energy between two fluids and has particular use for supercharging a reciprocating machine, such as a diesel engine. In a specific embodiment, the invention relates to improvements in supercharging whereby most of the problems associated with state of the art superchargers are eliminated or significantly minimized.

BACKGROUND ART

The most commercially successful supercharger arrangement for diesel engines to date is the type generally referred to as an aerodynamic wave machine in U.S. Pat. No. 2,853,987 and as the COMPREX (registered trademark of BBC Brown, Boveri & Co., Ltd., Baden, Switzerland), as described in a paper by Peter K. Doerfler, entitled "Comprex Supercharging of Vehicle Diesel Engines" presented at the Automotive Engineering Congress and Exposition in Detroit, Mich., Feb. 24–28, 1975. The basic principle of that supercharger is the transfer of pressure energy from high pressure engine exhaust gas to low pressure air which is then delivered at high pressure back to the engine. The wave machine includes a cylindrical chamber in which there is located a rotor with multiple radial vanes, the rotor being driven by a belt pick off from the engine. Openings are provided at the cylinder ends at appropriate locations to effect ingress and egress of fluid to and from the chamber. In operation, atmospheric air, present in the spaces between adjacent rotating vanes, experiences a pressure wave when it passes an inlet opening at one of the chambers to which the high pressure engine exhaust gas is directed. The compression wave, moving at the speed of sound, compresses the air as the wave passes by. The compressed air behind the wave occupies less space than before, permitting the engine exhaust gas to enter into the space between the vanes. As the compression wave reaches the opposite end of the cylinder, the vanes in question pass an outlet opening in that end which permits the compressed air to egress to the engine intake. By the time the compression wave reflects back toward the exhaust gas supply end of the chamber, the vanes have moved past the exhaust gas supply opening. Eventually the still slightly pressurized exhaust gas is permitted to egress from another chamber opening to ambient as the vanes pass the latter opening. A still further opening admits air into the space between the vanes before the rotation cycle is completed.

The aforementioned wave machine thus serves as a supercharger for the engine by utilizing the pressurized hot engine exhaust gases to pressurize the cold air delivered to the engine. The system is relatively efficient and has been used for a number of years. Nevertheless, there are some problems associated with the wave machine which have served as limiting factors on its increased utilization. Specifically, the wave machine requires additional controls during cold engine start up conditions because the exhaust gas flows straight through the machine to the engine intake under low engine RPM conditions. These controls usually take the form of a manually operated choke-like arrangement which moves a butterfly valve or the like in position to admit air into the engine from a source other than the wave machine. In addition, the wave machine has a rotor arrangement which is subject to temperature variations on the order of 800° C., thereby limiting the choice of materials that can be used and still maintain the critical dimensional tolerances necessary to keep the engine operating. Further, because of the complex moving parts and their critical tolerances, wear and tear and a continuing need for lubrication present significant problems. Still further, because of the relative complexity of the machine, the cost becomes a problem, particularly when the machine is used in conjunction with a passenger vehicle. Another problem relates to the fact that the wave machine must be driven by the engine, resulting in power loss and a limitation on the frequency of cyclic wave machine operation. The need to drive the wave machine from the engine also subjects the engine to being smothered by its exhaust gas if a drive belt breaks and also requires the wave machine to be located near the engine which often presents a severe space problem to a vehicle designer.

It is an object of the present invention to provide a supercharger method and apparatus in which the aforementioned problem and disadvantages are obviated without sacrificing engine performance.

It is also an object of the present invention to provide an apparatus and method for efficiently and economically transferring energy from one fluid to another, wherein the fluids may be liquid or gas.

DISCLOSURE OF THE INVENTION

In accordance with the present invention, atmospheric air in a flow passage is pulsedly driven by engine exhaust gas delivered from a commutating valve which is itself operated by the pressurized engine exhaust gas. In a preferred embodiment the commutating valve is a master fluidic oscillator which alternately and cyclically delivers slugs of pressurized exhaust gas to two such flow passages. Each flow passage connects to a respective slave fluidic oscillator which is synchronized in frequency to the master oscillator and driven solely by the fluid in the connecting flow passage. A check valve or similar arrangement in each flow passage permits atmospheric air to be aspirated into the flow passage when the master oscillator outflow is directed to the other flow passage, but blocks atmospheric air inflow when the flow passage containing the check valve is pressurized by inflow from the master oscillator. The slave oscillators in this arrangement alternately work on air and exhaust gas, in phase opposition. By tying appropriate legs of the two slave oscillators together, one passage of supercharged air and one passage of exhaust gas are formed.

The arrangement as described eliminates the need for driving the supercharger from the motor via a belt drive and therefore avoids the problems and disadvantages associated therewith. Further, the commutating valve is a much simpler mechanism which is not dependent on critical material choices and restrictive dimensional tolerances. If a master fluidic oscillator is employed as the commutating valve, the only moving parts in the arrangement are the simple valves which admit air into the flow passages. The resulting structure is far simpler and less expensive to manufacture and is reliable for long term operation.

BRIEF DESCRIPTION OF DRAWINGS

The above and still further objects, features and advantages of the present invention will become apparent upon consideration of the following detailed description of one specific embodiment thereof, especially when taken in conjunction with the accompanying drawings, wherein.

BEST MODE OF CARRYING OUT THE INVENTION

Figure 1:
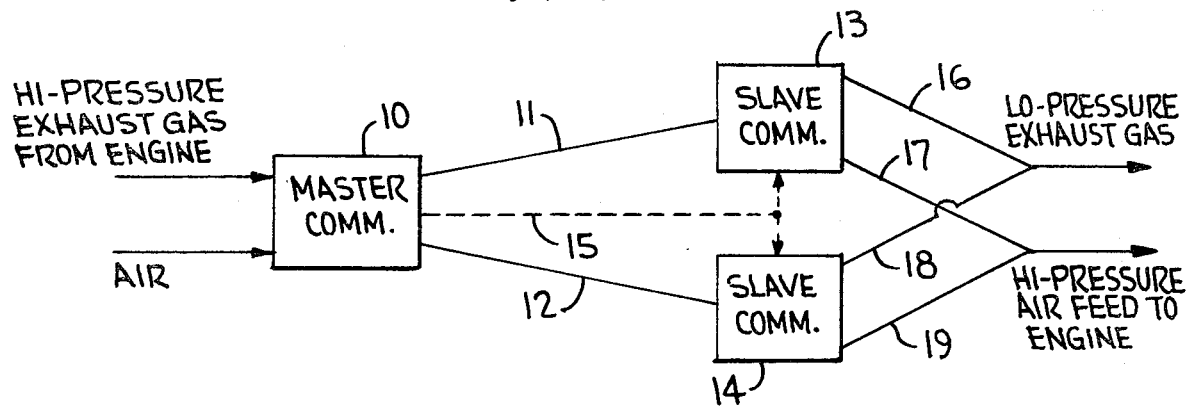
FIG. 1 is a functional block diagram of the present invention.

Referring specifically to FIG. 1 of the accompanying drawings, a master commutator 10 receives high pressure exhaust gas from a diesel engine, for example, and provides alternate slugs of that gas in two flow passages 11, 12. The commutator is of the type which is driven into its commutating mode by the pressurized exhaust gas and continuously cycles, at a frequency determined by throughflow, to distribute that same gas alternately to passages 11 and 12. One example of such a commutator is described below in relation to FIG. 2. Commutator 10 is also arranged to aspirate atmospheric air into lines 11 and 12 in alternation with the slugs of exhaust of gas.

Slave commutators 13 and 14 receive fluid from passages 11 and 12, respectively, and are driven into operation thereby. The frequencies, however, of commutators 13 and 14 are synchronized to the frequency of master commutator 10 as indicated by dotted control lines 15. Slave commutator 13 commutates the working fluid supplied thereto to flow passages 16 and 17, alternately. Slave commutator 14 alternately delivers its working fluid to flow passages 18 and 19. Passages 16 and 18 are tied together to deliver their outflow to a vented exhause pipe. Passages 17 and 19 are tied together to deliver their outflow to the engine air intake and, as described below, supplies the supercharged air to the engine.

In operation, atmospheric air in passage 11 is presurized by exhaust gas delivered to that passage by commutator 10. Slave commutator 13 thus alternately receives air, which is pressurized by the exhaust gas, and the exhaust gas itself. A similar sequence proceeds in passage 12 which feeds exhaust gas and pressurized air to slave commutator 14. However, exhaust gas flow into passages 11 and 12 occurs during opposite half cycles of the master commutator operation. This fact, combined with the fact that slave commutators 13 and 14 are synchronized to the same frequency as master commutator 10, results in the fact that slave commutator 13 receives pressurized air and delivers it to passage 17 while slave commutator 14 receives low pressure exhaust gas and delivers it to passage 18. Likewise, while slave commutator 13 delivers low pressure exhaust gas to passage 16, slave commutator 14 delivers pressurized air to passage 19.

The arrangement described above may utilize commutation to only one passage or to more than two passages, as long as frequency synchronization between master and slave commutators is so maintained to thereby assure that primarily pressurized air and primarily low pressure exhaust gas are caused to flow to the engine intake and exhaust pipe respectively. Commutators for accomplishing this are known in the art and may be of the mechanical type with moving valve parts, or may be fluidic oscillators having no moving parts as shown in the preferred embodiment of FIG. 2. Important, however, is the fact that the master commutator, whatever form it takes, is driven by the pressurized exhaust gas and not some mechanical or belt linkage from the engine motor.

Figure 2:
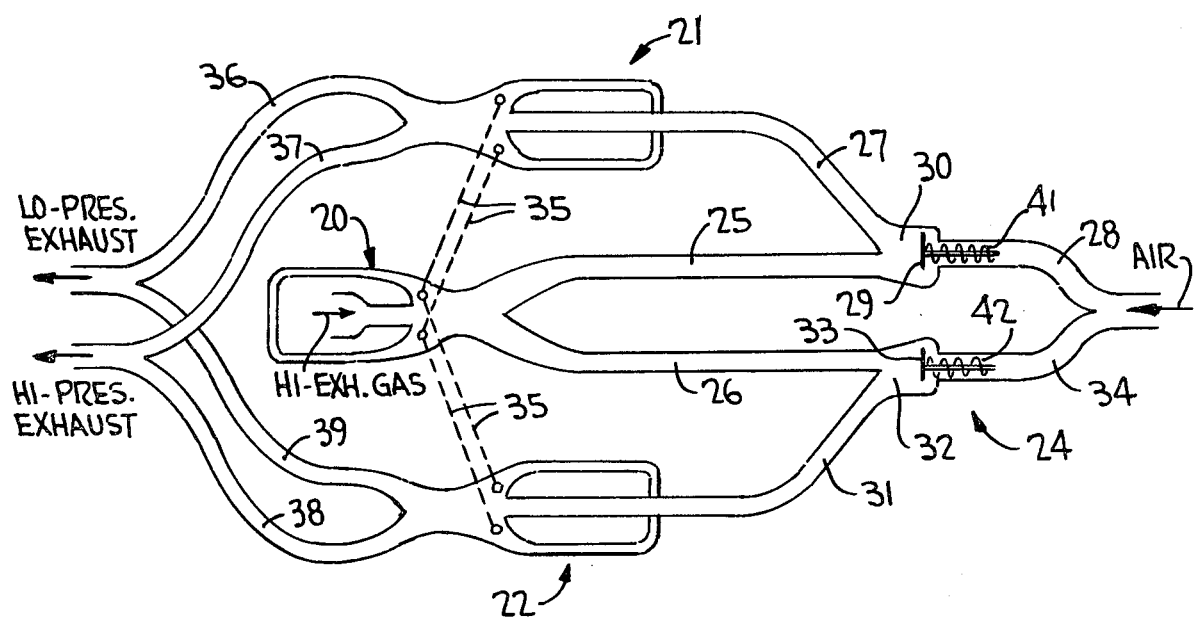
FIG. 2 is a schematic diagram of a preferred embodiment of the present invention.

Referring to FIG. 2 of the accompanying drawings, master commutator 10 of FIG. 1 is shown to include a fluidic oscillator 20 of the same general type described in my co-pending U.S. Patent Application Ser. No. 019,250, filed Mar. 9, 1979, and entitled "Fluidic Oscillator With Resonant Inertance and Dynamic Compliance Circuit". Likewise, slave commutators 13 and 14 take the form of the similar fluidic oscillators 21 and 22, respectively. It is to be understood that while the oscillator described in said co-pending patent application has many advantages in the present invention, other fluidic oscillators are similarly suited. In any event, hot pressurized exhaust gases from the engine are fed to the power nozzle of oscillator 20.

The master commutator also includes a pair of aspiration controls 23, 24 for admitting atmospheric air into the system. Specifically, oscillator 20 delivers the hot high pressure exhaust gas alternately to passages 25 and 26. Aspiration control 23 is located at the end of passage 25 at a junction 30 between passage 25 and a further passage 27. A further passage 28 opens into junction 30 and communicates with ambient air. A check valve 29 is disposed at the entry of passage 28 into junction 30 and is biased open (i.e. into junction 30) by spring 41. The function of valve 29 is to admit ambient air into junction 30 when the pressure in the junction is equal to or less than the sum of the pressure in passage 28 and the bias effects of spring 41. Valve 29 blocks air inflow to junction 30 when the junction pressure is above the sum of the pressure in passage 28 and the bias force of spring 41. Passage 27 supplies fluid to the power nozzle of fluidic oscillator 21.

Aspiration control 24 is similar to control 23 and includes a junction 32 at which passage 26 terminates along with an air supply passage 34 and a passage 31 which supplies fluid to the power nozzle of oscillator 22. Check valve 33 and bias spring 42 regulate inflow of air into junction 32 in response to pressure conditions in the junction.

Oscillators 21 and 22 are synchronized in frequency to the frequency of master oscillator 20 in the manner described in my aforementioned U.S. Patent Application Ser. No. 019,250. Specifically, small ports disposed on each side of the power nozzle of oscillator 20 communicate, by means of flow tubes 35, with corresponding ports in oscillators 21, 22. Outflow from oscillator 21 is alternately directed to flow passages 36 and 37 while outflow from oscillator 22 is alternately directed to flow passages 38 and 39. Passages 36 and 39 are joined together and feed the low pressure exhaust outlet. Passages 37 and 38 are joined and feed the supercharged air inlet to the engine.

In operation, exhaust gas from the engine, even at very low pressure, causes oscillator 20 to oscillate and deliver slugs of this hot pressurized exhaust gas to passages 25 and 26, alternately. Considering passage 25 first, atmospheric air present in passage 25 when the pressurized exhaust gas enters is pressurized by the sonic compression wave introduced therein by the leading edge of the entering exhaust gas slug. The pressurization of the air closes check valve 29, thereby blocking entry of additional ambient air into junction 30, and forces the now pressurized air through passage 27 to oscillator 21. The pressurized air is delivered to outlet passage 37 from oscillator 21. The exhaust gas delivered from oscillator 20 thus replaces the egressing air in passages 25 and 27. At the same time, with flow directed into passage 25 from oscillator 20, the fluid in passage 26, which is primarily exhaust gas from the previous half cycle, experiences an aspiration effect from the exhausting jet flowing into passage 25. In addition, the inertance effect in passage 26 tries to keep the exhaust gas flowing therein toward junction 32 as was the situation in the previous half cycle. This creates a condition of flow directed away from the mouth of passage 26 into both passages 25 and 26, resulting in an expansion or rarefaction wave propagating down passage 26 toward junction 32. This rarefaction wave travels at sonic velocity superimposed on the flow velocity in passage 26. Upon reaching junction 32 the rarefaction wave causes a pressure reduction sufficient to open valve 33 and thereby permit air to be aspirated into junction 32 from passage 34. It should be noted that fluid in passage 26, which flowed toward junction 32 before being overtaken by the rarefaction wave, reverses direction and flows back toward oscillator 20 after the rarefaction wave passes. As a consequence, air entering junction 32 flows into passage 26, eventually filling up that passage. On the other hand the inertance effect in passage 31 from the previous half cycle causes exhaust gas to continue flowing therethrough toward oscillator 22. This results in the air from junction 32 also flowing into and filling passage 31 behind the egressing exhaust gas which leaves oscillator 22 via passage 39.

At the start of the next half cycle of the oscillators, a slug of pressurized exhaust gas is delivered from master oscillator 20 to passage 26 which is now full of air. The resulting compression wave pressurizes the air in passages 26 and 31 and drives it through oscillator 22. Since slave oscillator 22 is also in its next half cycle, its outflowing pressurized air is now directed to passage 38 and into the supercharged air inlet for the engine. The compression wave travelling through passage 26 closes the valve 33 to prevent entry of air into junction 32, thereby permitting the incoming exhaust gas from master oscillator 20 to fill passages 26 and 31 behind the egressing pressurized air. During this same half cycle, a rarefaction wave is generated at the mouth of passage 25. This rarefaction wave produces the same effects in passage 25 and junction 30 as described in relation to passage 26 and junction 32 for the previous half cycle. As a result, valve 29 opens to permit air to fill passage 25 behind the aspirated exhaust gas and to fill passage 27 behind the egressing exhaust gas. The exhaust gas egressing from passage 27 flows through oscillator 21 to passage 36 from which it is vented.

The cycle as described above repeats continuously as long as there is pressurized exhaust gas applied to the power nozzle of master oscillator 20. As a consequence, air is continuously pressurized or supercharged from master oscillator 20 in one or the other of passages 25 or 26 and delivered to the engine air intake via one or the other of passages 37 or 38.

The invention as described is seen to perform the same functions as the prior art supercharger described herein; however, the present invention performs these functions much more advantageously. For example, since the fluidic oscillators described operate at very low pressures (e.g. on the order of 0.1 psi), commutation occurs at oscillator 20 even during cold start-up and no cold start arrangement is necessary. In addition, the only moving parts required in the embodiment of FIG. 2 are the valves 29, 33 or their equivalent which are very simple and reliable items. There are no rotors or bearings or lubrication requirements associated therewith; nor are there critical dimensional tolerances or material selection problems. The fact that the commutator is driven by the exhaust gas directly, rather than by a belt drive from the engine motor, eliminates failure potential due to belt wear, permits the device to be mounted relatively far from the engine where there is likely to be greater space available, and permits commutation to be at frequencies determined by flow velocity rather than engine speed. All of these features contribute to much lower cost and simpler manufacturing techniques than can be achieved with prior art superchargers.

As mentioned above, the present invention is not limited to superchargers. It is useful for any application where pressure energy is to be transferred from one fluid to another, irrespective of the nature of the fluid.

It should also be noted that plunger valves 29, 33 can be any valve arrangement which performs a check valve function required for the present invention.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus for transferring energy from a first fluid at relatively high pressure to a second fluid at relatively low pressure comprising:

master commutator means responsive solely to application of said first fluid thereto under pressure for forming a series of discrete spaced slugs of said first fluid;

a fluid passage having first and second ends;

means for establishing compression waves in said fluid passage by delivering said discrete slugs of said first fluid to said first end thereof;

means for admitting said second fluid into said fluid passage between slugs of said first fluid such that said second fluid is pressurized by said compression waves; and slave commutator means for receiving fluid from said fluid passage at the second end thereof and separating said first fluid from said second fluid.

2. The apparatus according to claim 1 wherein said master commutator means and said slave commutator means are fluidic oscillators which are frequency-synchronized.

3. The apparatus according to claim 1 further comprising a second fluid passage, wherein said master commutator means is arranged to deliver said slugs of first fluid alternately to said fluid passage and said second fluid passage, and further comprising means for admitting said second fluid into said second fluid passage between slugs of said first fluid such that said second fluid is pressurized by compression waves generated by said first fluid, and further slave commutator means for separating said first and second fluids in said second flow passage.

4. The apparatus according to claim 3 further comprising means for combining the second fluid separated by said slave commutator means with the second fluid separated by said further slave commutator means.

5. The apparatus according to claims 1, 3 or 4 wherein said master commutator means, said slave commutator means and said further slave commutator means each include fluidic oscillators having no moving parts, and further including means for synchronizing said fluidic oscillators to operate at the same frequency.

6. The apparatus according to claim 5 wherein said means for admitting includes check valve means in said fluid passage for admitting second fluid into said fluid passage when first fluid flow from said master commutator is directed into said second fluid passage.

7. A method for transferring energy from a flowing first fluid at relatively high pressure to a second fluid at relatively low pressure comprising the steps of:

forming a series of discrete spaced slugs of said first fluid at a frequency determined by the flow rate of said first fluid;

establishing compression waves in a fluid passage by delivering said discrete slugs of said first fluid to a first end thereof;

admitting said second fluid into said fluid passage between slugs of said first fluid such that said second fluid is pressurized by said compression waves;

receiving fluid from said fluid passage at the second end thereof and separating said first fluid from said second fluid.

8. The method according to claim 7 wherein said step of forming is achieved without moving parts.

9. The method according to claim 7 wherein said slugs of first fluid are delivered alternately to said fluid passage and a second fluid passage, and further comprising the steps of admitting said second fluid into said second fluid passage between slugs of said first fluid such that said second fluid is pressurized by compression waves generated by said first fluid, and separating said first and second fluids in said second flow passage.

10. The method according to claim 9 further comprising the step of combining the second fluid separated from said fluid passage with the second fluid separated from said second fluid passage.

11. The method according to claims 7, 9 or 10 wherein said steps of forming and separating are performed by fluidic oscillators having no moving parts, and further comprising the step of synchronizing said fluidic oscillators to operate at the same frequency.

* * * * *